UNITED STATES PATENT OFFICE.

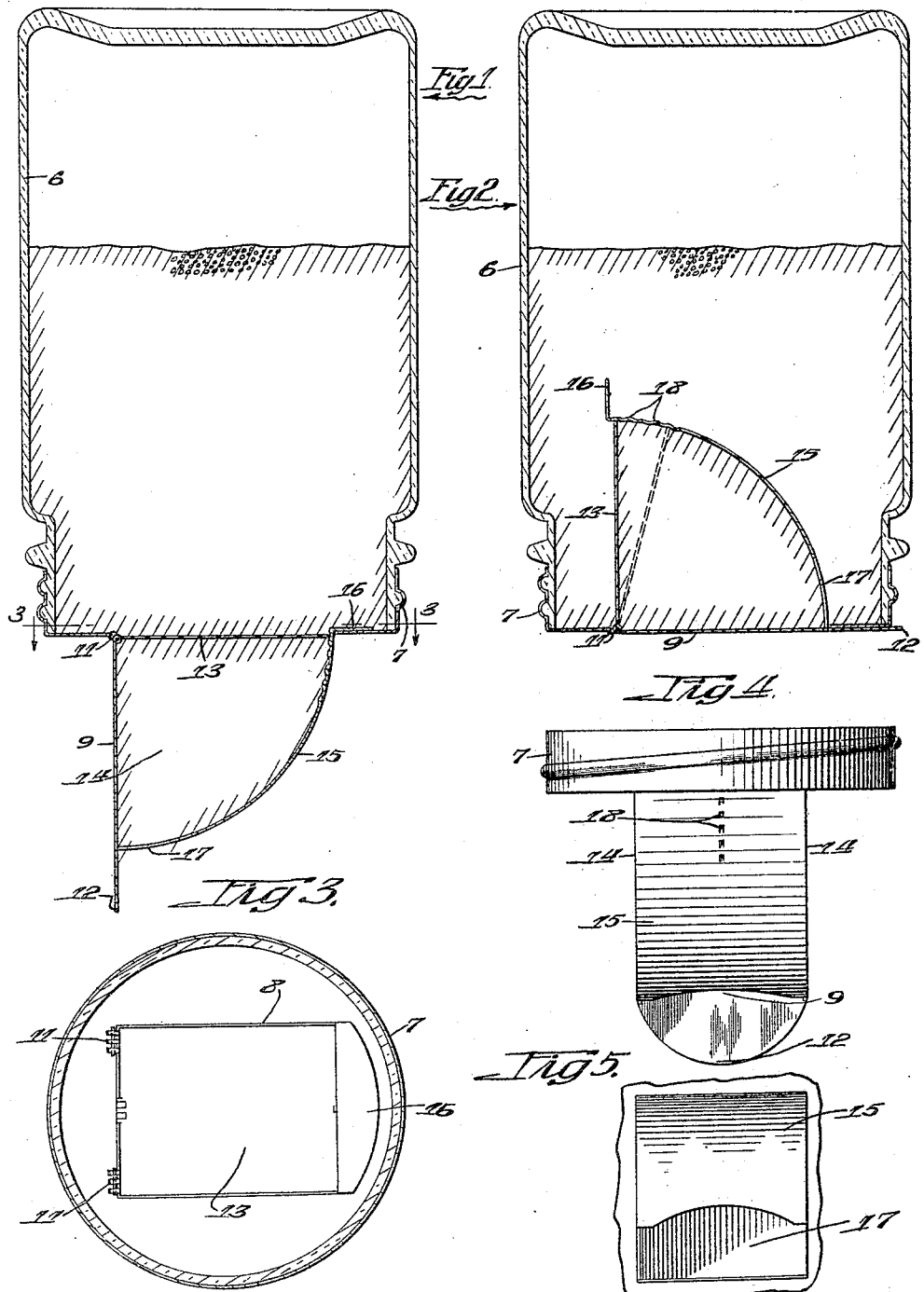

JOHN R. CONDON, OF ROCKFORD, ILLINOIS, ASSIGNOR TO CONDON BROS., SEEDSMEN, OF ROCKFORD, ILLINOIS, A CORPORATION OF ILLINOIS.

MEASURING AND DISPENSING DEVICE.

1,411,000.  Specification of Letters Patent.  Patented Mar. 28, 1922.

Application filed August 8, 1921. Serial No. 490,818.

*To all whom it may concern:*

Be it known that I, JOHN R. CONDON, a citizen of the United States, residing at Rockford, in the county of Winnebago and State of Illinois, have invented certain new and useful Improvements in Measuring and Dispensing Devices, of which the following is a specification.

This invention relates in general to devices for measuring and dispensing various commodities, and has more particular reference to those especially adapted for dispensing given quantities of seed. It should be understood, however, that my invention is in no way limited to this particular use as it is equally well adapted for dispensing various commodities in powdered, granulated and other forms.

The primary object of the invention is to provide a novel measuring and dispensing device adapted to be applied to the top or cover of a Mason jar or the like, so that the contents in predetermined quantities may be dispensed by inverting the jar.

Another object is to provide a device of this character particularly adapted for measuring and dispensing seeds of different varieties, and for quickly and easily varying the contents capacity of the measuring device in accordance with the different varieties of seed.

Still another object is to provide a measuring and dispensing device constructed in such simple manner that it may be produced at a comparatively low cost and will serve practically and effectually the purposes intended.

My invention also contemplates the provision of a device of the character described pivotally mounted on the cover of a container such as a Mason jar and having an outer wall projecting beyond the edge of the cover and serving as a finger grasp adapted to be conveniently engaged for swinging the device to a dispensing position.

Other objects and attendant advantages will be appreciated as the invention becomes better understood by reference to the following description when considered in connection with the accompanying drawings, in which—

Figure 1 is a vertical section through a container, inverted, showing the measuring device swung to a dispensing position;

Fig. 2, a similar sectional view showing the measuring device swung to a closed position;

Fig. 3, a sectional view taken on the line 3—3 of Fig. 1;

Fig. 4, a view looking at the right hand side of the cover and dispensing device in the position shown in Fig. 1; and Fig. 5 is a bottom or end view of the measuring device in the dispensing position.

The container in this instance is in the form of a conventional Mason jar 6, the neck of which is shaped to receive the screw top or cover 9. This cover has a discharge opening 8 in which is disposed a measuring and dispensing device adapted as the name implies, to measure the quantity of contents to be dispensed. In the particular use to which the present device is adapted, it is desired to utilize a single measuring and dispensing device and to vary the contents capacity to suit the particular variety of contents being dispensed. That is, in filling seed envelopes or containers, the quantity desired to be dispensed varies with the different varieties of seed, and by providing measuring devices of the character disclosed herein, each device may be quickly and easily adjusted to dispense the desired contents capacity.

This measuring and dispensing device comprises an outer wall 9 pivotally connected by any suitable means as at 11, to the cover and normally closing the opening 8. This wall extends beyond the side of the cover as at 12, Fig. 2, providing an extended finger grasp which may be conveniently engaged for swinging the cover and consequently the measuring device, from the closed position shown in Fig. 2, to the dispensing position shown in Fig. 1. The measuring device is formed of this outer wall 9, an inner wall 13 also pivotally connected to the cover substantially concentrically with the outer wall, side walls 14 fixed with respect to the outer wall, and an arcuate wall 15 concentric with the pivot 11 and joining the side walls 14. This outer wall is shaped at its inner end to provide an abutment 16, which as shown in Fig. 1, limits the outward movement of the measuring device. This arcuate wall at its outer end terminates short of the wall 9, thereby forming a filling and dispensing opening 17. The inner wall 13 is adjustable about its pivot to vary the contents capacity of the measuring device, and any suitable means may be provided for securing this wall in any adjusted position. In the present instance, a series of depressions 18 are formed in the arcuate wall 15 adapted for holding the wall 13 in any of its adjusted positions.

From the foregoing it will be manifest that when it is desired to dispense a given quantity of contents, the jar which normally stands upright, will be inverted to the position shown in Fig. 2, and then tilted sufficiently in a counter-clockwise direction, permitting the contents to flow through the passage 17 into the measuring device until the latter is filled. Still holding the measuring device in this inverted and tilted position, the projection 12 will be engaged by a downward movement of the hand, thereby swinging the measuring device to the position shown in Fig. 1, in which the contents of the measuring device will be dispensed through the opening 17, escape of the contents from the jar being effected by the inner wall 13. It will be further observed that the measuring device constitutes a spout of special utility in delivering the contents directly into an envelope or carton in which the contents are to be sold or shipped. The jar in the dispensing position is usually inclined rather than in the vertical position shown. It will be manifest that the contents capacity of the measuring device may be very easily changed to suit the particular variety of seed, or other commodity being dispensed. It will also be evident that this device affords a means for quickly and accurately measuring and dispensing contents of the nature described without danger of waste.

It is believed that the foregoing conveys a clear understanding of the objects prefaced above, and while I have illustrated but a single working embodiment, it should be understood that various changes might be made in the details of construction without departing from the spirit and scope of the invention as expressed in the appended claim.

I claim:

A measuring and dispensing device comprising a container having a discharge opening, a combined measuring device and spout disposed in said opening and pivotally attached to the container, said device having an outer wall adapted to close said opening, an inner wall projecting inwardly from and pivotal about the pivot axis of said outer wall, side walls fixed to the outer wall, an arcuate wall concentric with said pivot axis and joining the side walls and providing a filling and dispensing mouth, and means for holding said inner wall in any of a plurality of adjusted positions whereby to vary the contents capacity of the measuring device.

JOHN R. CONDON.